(12) United States Patent
Wu et al.

(10) Patent No.: US 10,719,417 B2
(45) Date of Patent: Jul. 21, 2020

(54) DATA PROTECTION CLUSTER SYSTEM SUPPORTING MULTIPLE DATA TIERS

(71) Applicant: EMC IP Holding Company LLC, Hopkinton, MA (US)

(72) Inventors: Peng Wu, Shanghai (CN); Yong Zou, Santa Clara, CA (US)

(73) Assignee: EMC IP Holding Company, LLC, Hopkinton, MA (US)

(*) Notice: Subject to any disclaimer, the term of this patent is extended or adjusted under 35 U.S.C. 154(b) by 229 days.

(21) Appl. No.: 15/883,832

(22) Filed: Jan. 30, 2018

(65) Prior Publication Data

US 2019/0235978 A1 Aug. 1, 2019

(51) Int. Cl.
*G06F 11/20* (2006.01)

(52) U.S. Cl.
CPC .... *G06F 11/2033* (2013.01); *G06F 2201/805* (2013.01); *G06F 2201/85* (2013.01)

(58) Field of Classification Search
CPC .............................. G06F 11/20; G06F 11/2033
USPC ......................................................... 714/4.11
See application file for complete search history.

(56) References Cited

U.S. PATENT DOCUMENTS

| | | | | |
|---|---|---|---|---|
| 7,287,180 B1* | 10/2007 | Chen | .................. | G06F 11/2033 714/11 |
| 8,671,013 B2* | 3/2014 | Cobb | .................... | G06Q 10/00 705/7.38 |
| 8,935,563 B1* | 1/2015 | Rajaa | .................. | G06F 11/0709 714/4.11 |
| 8,996,837 B1* | 3/2015 | Bono | .................... | G06F 3/0614 711/114 |
| 9,223,606 B1* | 12/2015 | Vaidya | ................ | G06F 9/45558 |
| 9,594,514 B1* | 3/2017 | Bono | ...................... | G06F 12/00 |
| 2002/0198996 A1* | 12/2002 | Sreenivasan | ........... | H04L 69/40 709/226 |
| 2006/0173895 A1* | 8/2006 | Engquist | ............... | G06F 9/5061 |
| 2008/0183991 A1* | 7/2008 | Cosmadopoulos | | ........................ G06F 11/2097 711/162 |
| 2010/0114889 A1* | 5/2010 | Rabii | .................. | G06F 16/1824 707/737 |
| 2011/0289344 A1* | 11/2011 | Bae | ........................ | G06F 11/181 714/4.2 |
| 2012/0278569 A1* | 11/2012 | Kawakami | ............ | G06F 3/0608 711/162 |

(Continued)

*Primary Examiner* — Kamini B Patel
(74) *Attorney, Agent, or Firm* — Barry N. Young

(57) ABSTRACT

A hierarchical multi-level heterogeneous cluster data system having processing nodes at each of a plurality of cluster levels configured for different data tiers having different availability, accessibility and protection requirements. Each cluster level comprises groups of processing nodes arranged into a plurality of failover domains of interconnected nodes that exchange heartbeat signals to indicate that the nodes are alive and functioning. A master node of each failover domain is connected to a master node of a parent failover domain for exchanging heartbeat signals to detect failures of nodes at lower cluster levels. Upon a network partition, the nodes of the failover domain may be merged into another failover domain at the same or a higher cluster level to continue providing data services. The cluster has a global namespace across all cluster levels, so that nodes that are moved to different failover domains can be accessed using the same pathname.

15 Claims, 7 Drawing Sheets

(56) References Cited

U.S. PATENT DOCUMENTS

2014/0365816 A1* 12/2014 Antony ............... G06F 9/45558
                                                    714/6.11
2017/0364423 A1* 12/2017 Peng ................... G06F 11/2025
2019/0146718 A1*  5/2019 Ben Dayan ........... G06F 3/0604

* cited by examiner

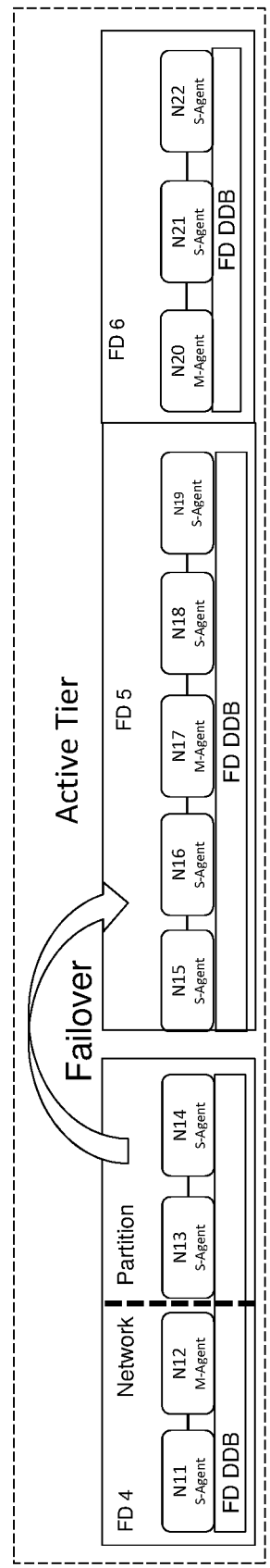
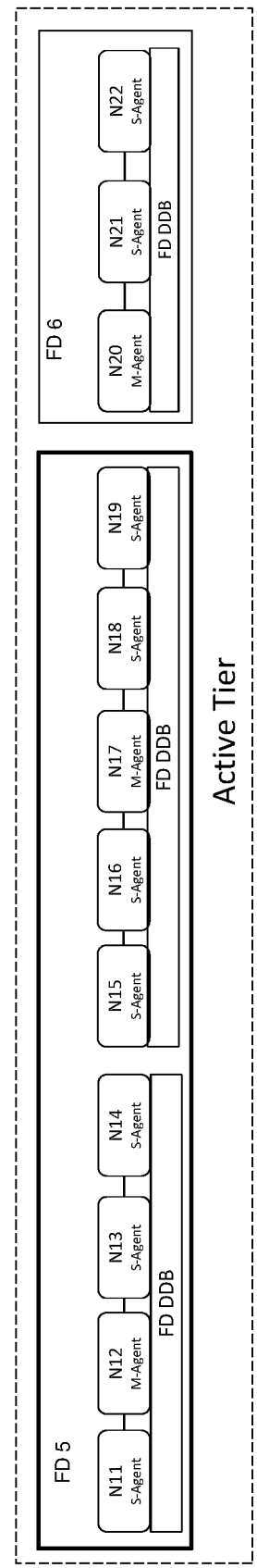
Fig. 4A
Fig. 4B

DATA PROTECTION CLUSTER SYSTEM SUPPORTING MULTIPLE DATA TIERS

BACKGROUND

This invention relates generally to cluster data systems, and more particularly to new and improved cluster architectures, systems and methods for data storage and data protection which address problems associated with known traditional cluster architectures, systems and methods.

Today data protection systems are moving to a scale-out cluster system architecture from a single controller model because larger storage capacities are required and single controller system architectures are unable to support the larger capacities required. Known traditional cluster systems are usually one-level flat systems in which all cluster nodes are in same logical level, and the cluster membership is just a single list of all nodes in the cluster. The nodes coordinate together and cooperate as a logical unit to provide cluster capabilities and features (such as availability, scalability, fault tolerance, redundancy, consistency, etc.) for the applications and services. The common way for traditional cluster systems to scale is to add more nodes into the cluster. However, most traditional cluster systems only support a limited number of members (hosts/nodes) due to their architectural design and other fundamental limitations, so that expanding the number of nodes in such systems is challenging. One such challenge is because of the overhead required to support large numbers of nodes, including the overheads associated with providing heartbeats between nodes, ordering messages and maintaining a consistent state across nodes. The more nodes, the more overhead is required to maintain node membership, particularly in virtual machine clusters.

Another issue concerns network partitions. A network partition is where a cluster is divided into two or more partitions that cannot communicate with each another because of network problems. As a result, a portion of the cluster's processing and services become unavailable. A traditional cluster system does not handle network partitions well. The larger a cluster becomes, the higher is the possibility of a network partition problem occurring.

Additionally, data protection systems typically have to work with multiple different types of data having storage requirements based upon the data's required availability. For instance, so-called "hot data" is data such as newly backed up data that is very likely to be accessed soon, and requires high sequential throughput (I/O) and rapid random access. This type of data may be referred to as "active tier" data. Other so-called "cold data" includes data that must be retained for a long period of time and is infrequently accessed. It is referred to as "archive tier" data. Very cold data that is retained substantially permanently may be retained in cloud storage and referred to as "cloud tier" data. Recently another data tier used for caches and data requiring fast access and a random I/O workload has emerged. It is referred to as "SSD tier" data because it is stored in fast solid state memory. Because of their different availability requirements, the different types of data require different types of cluster nodes having different types of hardware and software. This necessitates heterogeneous nodes and a heterogeneous cluster architecture. Today's cluster systems are not optimized to support either heterogeneous systems or multiple data tiers for different data types, nor are known systems and architectures optimized to handle node failures. Moreover, managing such a heterogeneous architecture to ensure the required data availability, accessibility and protection poses additional challenges which known cluster systems are unable to meet.

It is desirable to provide new and improved heterogeneous data protection architectures, systems and methods for supporting multiple tiers of data types having different availability, retention and protection requirements that address the foregoing and other problems with known storage architectures, systems and methods, and it is to these ends that the invention is directed.

BRIEF DESCRIPTION OF THE DRAWINGS

FIGS. 4A and 4B illustrate a failover within the same data tier due to a network partition, FIG. 4A showing failover of nodes in a first failover domain experiencing a network partition to another second failover domain at the same data tier, and FIG. 4B showing a reconfigured second failover domain following the failover;

DESCRIPTION OF PREFERRED EMBODIMENTS

Figure 1:
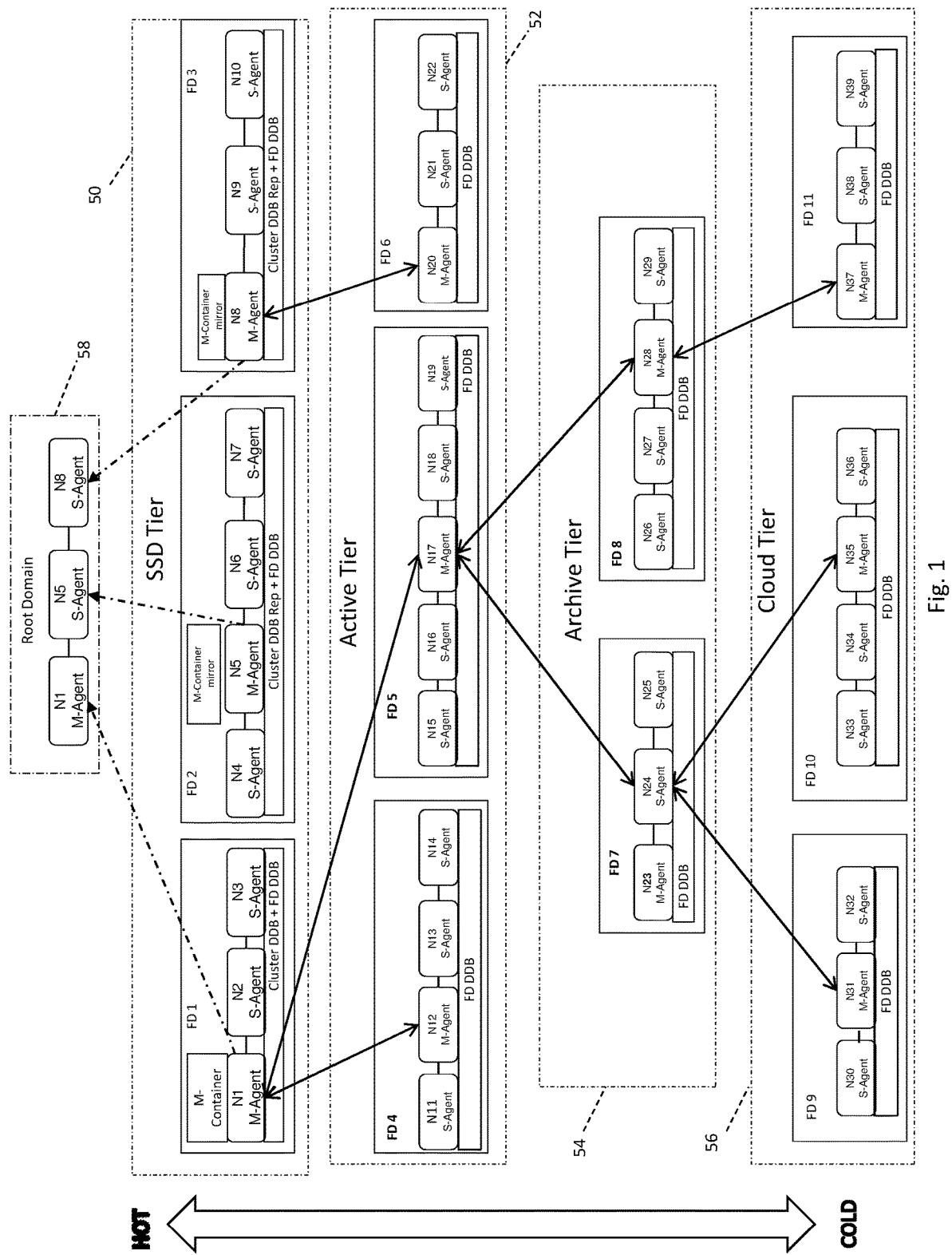
FIG. 1 is a diagrammatic view of a hierarchical membership cluster system ("HMCS") architecture in accordance with the invention, the architecture providing multiple nodes organized in multiple failover domains in multiple data tiers.

The invention is particularly well adapted to very large scale-out cluster data storage systems requiring expandability, high data availability and high data protection, and will be described in that environment. However, as will become evident, this is illustrative of only one utility of the invention and the invention has applicability to other types of data systems.

Briefly summarized and as will be described in more detail, the invention affords a new multi-tier data cluster architecture having hierarchical membership of heterogeneous cluster nodes at multiple cluster levels corresponding to the multiple data tiers having multiple failover domains comprising groups or clusters of nodes (as will be described more fully below) at each data tier. Each group of nodes comprising a failover domain can serve a specific data tier. The multi-tier cluster supports a global namespace across the entire cluster, including across data tiers and node groups, and this namespace may be exposed to a user to facilitate backup and management of the multiple tiers as a single file system. By architecting the cluster to have multiple failover domains in different hierarchical levels (tiers), the invention affords a clear mapping relationship that enables one or multiple failover domains to serve data tiers at the same level, while enabling nodes of the failover domains to be merged in the event of node failures or network partitions.

As used herein, failover domain refers to a group (sometimes referred to herein as a "cluster") of network nodes at the same cluster membership level (data tier) that are logically grouped together in a unique failover domain. The cluster may have multiple failover domains at different hierarchical levels of the cluster, and the nodes in each failover domain have their own cluster (group) configuration for redundancy and availability, such as A-A (active-active), or N+1 or N+M A-P (active-passive). Each domain may also have its own fault tolerance policy. For example, a policy may be that a failover domain must have more than half of its nodes available to provide services, which for a 2N+1 node domain means that the domain can tolerate at most N node failures. In an embodiment, upon a node failure, its application services preferably failover to another node inside of the same failover domain. Also, failover may occur within the same tier across failover domains (as where multiple nodes in a failover domain fail) as long as the source and target domains have the same configurations. Different failover domains may have different failover policies. This allows the cluster management to focus on hierarchical domains rather than on a set of nodes.

A network partition occurs when because of a failure one or more nodes within a failover domain are unable to communicate with other nodes within the failover domain, although they may still have live network connections with nodes in other failover domains, and still be able to provide services. In an embodiment, when a network partition occurs, a cluster in accordance with the invention enables nodes that have been cut-off (and their resources) to be moved temporarily and merged into other failover domains so that they can continue to provide cluster services. Once the network partition is resolved, the nodes may be moved (automatically or manually) back to their original failover domain.

FIG. 1 is a diagrammatic view illustrating the architecture of an embodiment of a hierarchical membership cluster system ("HMCS") in accordance with the invention for multi-tier data storage and protection. As shown in the figure, the cluster may have a plurality of data nodes (N1-N39) organized into groups of failover domains (FD) (1-11) at four (in the embodiment shown in the figure) different hierarchical levels 50-56 of the cluster. The nodes may all be interconnected in a network (not shown). Each hierarchical level may correspond to a different data tier having different node configurations and performances to support different data I/O, availability and retention requirements, while providing protection for the data in the event of failures.

As shown in the figure, the different cluster levels (data tiers) may be an SSD tier 50, and active tier 52, an archive tier 54 and a cloud tier 56. Each data tier may have different hardware (and software) such as different CPU processors, memory, hard disks, and solid state disks selected for the required accessibility, availability and storage longevity of the data. Data at the different levels may be referred to in terms of its data "temperature" from "hot" to "cold". For example, the SSD tier 50 may be used for data that must be available substantially instantly, such as for caches, for data that must be randomly accessed, and for virtual machines (VMs). Fast random access is afforded by solid state memory and solid state disks (SSD) which may be used in this tier. Data in the active tier 52 may be primarily new data that is likely to be restored or replicated soon, as well as data destined for deduplication which requires high sequential access and high random I/O. Data in the archive tier 54 is "cold" data that for policy or other requirements must be retained for a very long time. It may use long term storage such as tape, for example. And data in the cloud tier 56 is for data that is "very cold" data such as data that is replicated from long term or other storage. It may, as the name implies, store data in cloud storage. Each level may also employ processors and other hardware suitable to the requirements for data stored at that data tier. Initially, clients may store "hot" data in either the SSD tier or the active tier depending upon its type and required availability. Later, as the data becomes "cold", it may be moved to a "colder" tier such as the archive tier or the cloud tier.

As mentioned, each level of the cluster has several failover domains, and each failover domain comprises a number of nodes, e.g., three to eight, that provide services for data in that data tier. For instance, in the embodiment illustrated in FIG. 1, in the SSD tier 50 there are three failover domains, FD1-FD-3. In the active tier 52, there are also three failover domain FD4-FD 6; in the archive tier 54 there are two failover domains FD7 and FD8; and in the cloud tier 56 there are three failover domains FD9-FD-11. In the SSD tier, FD1 comprises three nodes N1-N3, FD2 comprises four nodes N4-N7, and FD3 comprises three nodes N8-N10. As shown in the figure, the other failover domains may have different numbers of nodes. In accordance with the invention, as will be appreciated, other clusters may have different numbers of data tier levels, failover domains and nodes.

Within each failover domain, one node will be a master node, and the remaining nodes will be slave nodes. For example, as shown in FIG. 1, node N1 is the master node and nodes N2 and N3 are slave nodes in FD1. Nodes N5 and N8 are master nodes in FD2 and FD3, respectively. Similarly, N12, N17 and N20 are master nodes in active layer 52 failure domains FD4, FD5 and FD6, respectively; and N24 and N28 are master nodes in FD7 and FD8, respectfully. Master nodes run a master agent (M-Agent) and slave nodes run a slave agent (S-Agent). A master node may have two roles. One role is as a high availability (HA) master node, and the other role is as a namespace master node. Each failover domain may have only one HA master, but may have multiple namespace masters. Initially, all nodes within a failover domain will be "worker" nodes, and each node will be either in an active state or in a standby state. Only active state nodes can provide cluster application services to clients.

Nodes within a failover domain may be organized (in a well known manner) into a storage pool for availability. When a failure occurs, data services are made available through failover. Because different tiers may have different hardware and performance, a storage pool does not extend across different data tiers. In each failover domain, one node may be elected as a master node, as by using well known procedures for choosing a master node in a node group. Failover domain configurations are executed by the failover domain master. By default, the HA master and the namespace master roles exist on the same node. At the top level of the cluster, there is a root domain 58, which is a logical construct comprising the master nodes N1, N5, and N8 of the failure domains of the top SSD tier 50. In the embodiment of FIG. 1, node N1 runs a master agent (M-Agent), as indicated, and may be the cluster master mode; nodes N5 and N8 run slave agents (S-Agent) and are cluster slave nodes. The master node in the root domain provides cluster level management services and decisions. Cluster wide configurations are done by the root domain master N1.

As shown in the figure, each failover domain has a distributed database (FD DDB) which is used to store failover domain-level information such as a list of nodes, node configurations, etc., for that failover domain. The distributed database of each failover domain is accessible by all nodes of the failover domain. Additionally, failover domain FD1 in the SSD data tier 50 also has a distributed cluster database (Cluster DDB) which is replicated in the other failover domain FD2 and FD3 of the SSD data tier, and which stores cluster-level information, such as node information from all levels of the cluster.

The following is an example data structure code for a failover domain:

```
/* HMCS_node_state_t defines the possible states of cluster node */
enum HMCS_node_state_t {
    HMCS_NODE_STATE_UNKNOWN = 0,
    HMCS_NODE_ STATE _ACTIVE = 1, /* Active */
    HMCS_NODE_ STATE _STANDBY = 2, /* Standby */
};
typedef enum HMCS_node_state_t HMCS_node_state_t;
/* HMCS_node_info_t defines the cluster node information */
typedef struct {
int64 id; /* Node ID (unique) */
int64 fd_id; /* ID of the Failover Domain which this node belongs to */
bool is_fd_ha_master; /* Is Failover Domain HA Master or not */
bool is_fd_namespace_master; /* Is Failover Domain Namespace Master or not */
HMCS_node_state_t state; /* Node state */
char name[256]; /* Node Name */
    char primary_ip[64]; /* Node primary/external IP */
char interconnect_ip[64]; /* Node interconnect IP */
} HMCS_node_info_t;
/* HMCS_failover_domain_t defines the Failover Domain information
*/
typedef struct {
int64 id; /* Failover Domain ID (unique) */
int64 parent_id; /* Parent Failover Domain ID */
bool_is_root_fd; /* Is Root Failover Domain or not */
char name[256]; /* Failover Domain Name */
char fd_ip[64]; /* Failover Domain IP */
} HMCS_failover_domain_t;
```

Figure 3:
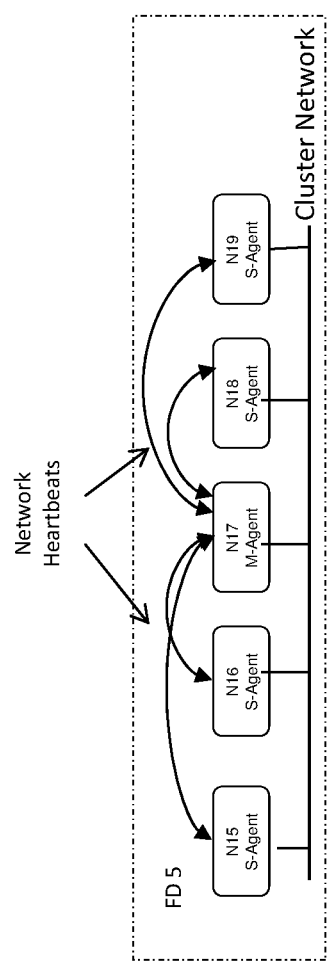
FIG. 3 is a diagrammatic view illustrating the exchange of heartbeats between nodes within a failover domain for detecting node failures.
Figure 5A:
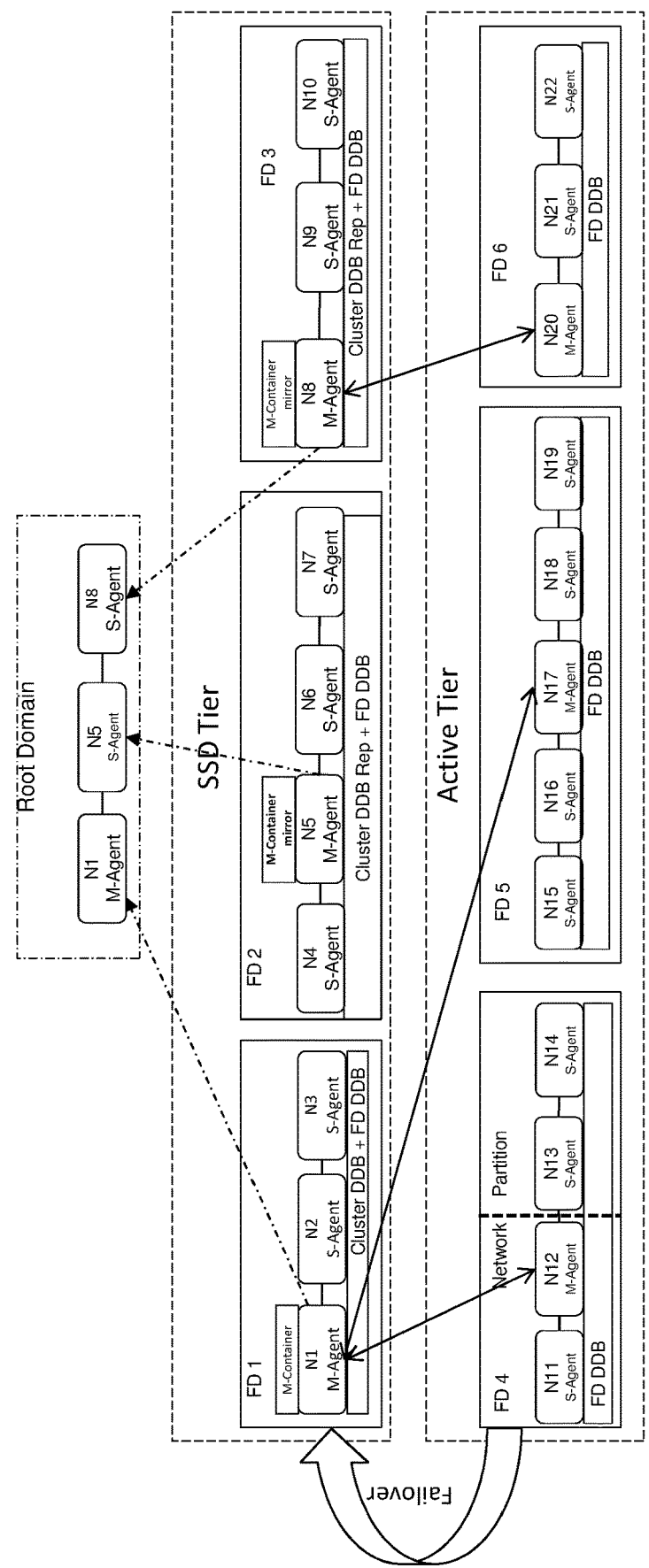
FIGS. 5A and 5B illustrate failover across different data tiers due to a network partition, FIG. 5A showing failover of nodes in a first failover domain at a first data tier that experiences a network partition to a second failover domain at a second higher data tier, and FIG. 5B showing reconfigured failover domains at the first and second data tiers following the failover.
Figure 5B:
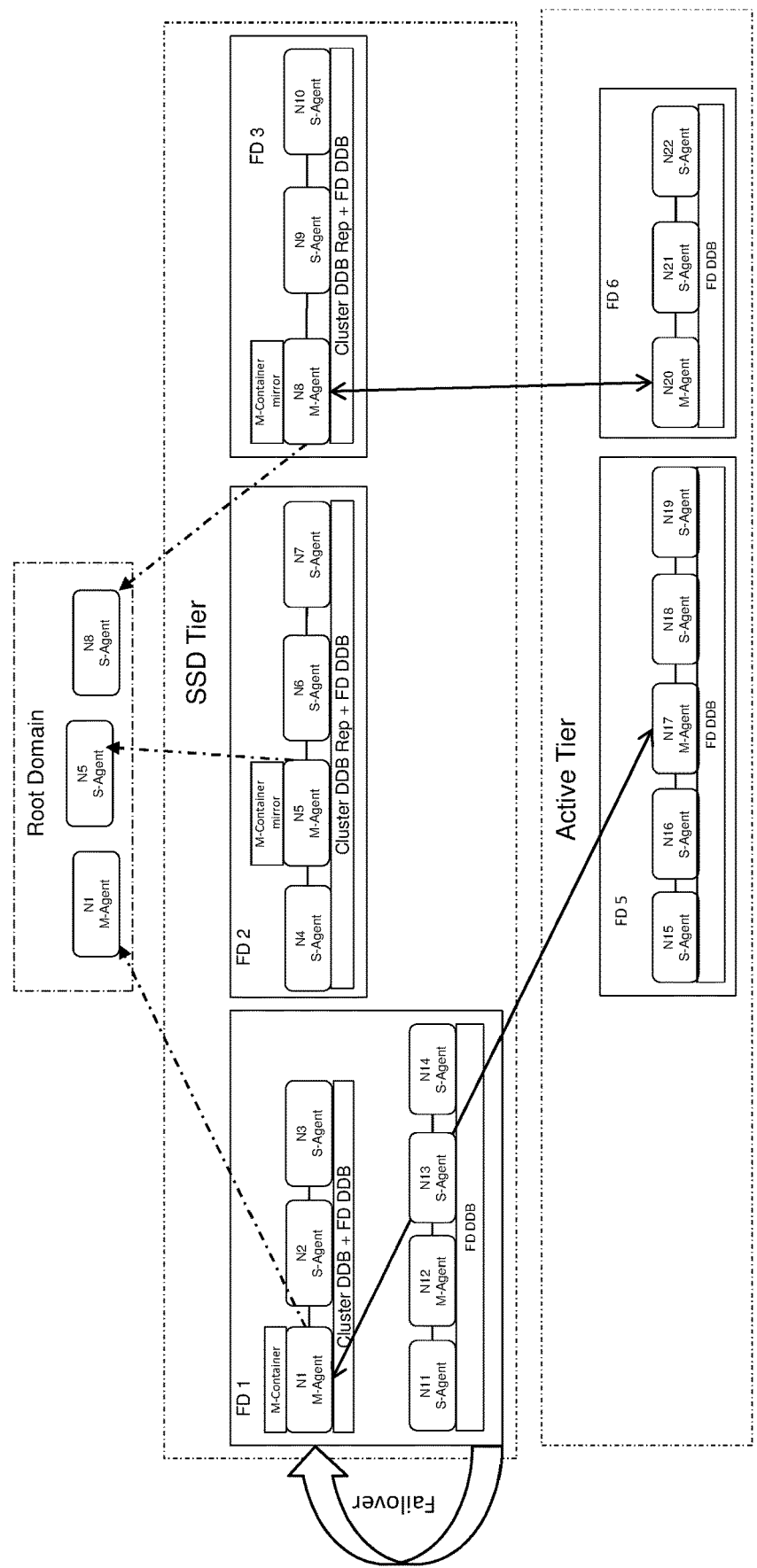

As will be described in more detail below, the cluster maintains an awareness of the operational of state of each node by exchanging heartbeats-periodic signals sent by each node that indicate that the node is still alive and functioning, and takes appropriate action to reconfigure the cluster when a failure occurs. Within each failover domain, the master node of that failover domain and the other slave nodes of the failover domain will exchange heartbeats with each other to monitor the status of the nodes of the failover domain. As shown in FIG. 3, using failover domain FD5 as an example, master node N17 exchanges bidirectional heartbeats with the slave nodes N15-N16 and N18-N19 of FD5, as indicated by the double headed arrows and dotted lines between the master node N17 and the other nodes N15-N16 and N18-N19 of FD5. The master node listens for heartbeats form the slave nodes of the domain, and the slave nodes listen for heartbeats from the master. A node failure is detected by the absence of heartbeats. When the master node fails, a predefined protocol may be followed to elect a new master. For the overall cluster, the masters of the various failover domains may exchange bidirectional heartbeats with the masters of the failover domains in adjacent data tiers, as indicated by the double headed arrows shown in FIG. 1 between master nodes, in order to maintain an awareness of the operational states of the failover domains. A predefined cluster wide policy may determine which master nodes exchange heartbeats with other master nodes. When a master node fails, its parent tier master node prepares to accept a connection from a newly elected master node. For instance, master N1 in the SSD data tier may exchange heartbeats with masters N12 and N17 in the active data tier, and master N17 may exchange heartbeats with masters N24 and N28 of the archive data tier, as shown. Node N1 is also the cluster master. N1 maintains overall awareness of cluster operations and manages cluster-level reconfigurations in the event of failures. (For ease of illustration, not all bidirectional exchanges are shown in the figure.) By using distributed and localized monitoring of heartbeats, as described, a cluster architecture in accordance with the invention avoids the significant overhead otherwise associated with monitoring heartbeats for a large number of nodes, as in a traditional one-level cluster architecture. Details of failure management and reconfigurations due to failures will be described below.

The architecture of the cluster supports a global name space across the different data tiers. This permits cluster-wide access of nodes using a single file name, as in a file system, and permits data moved across tiers to be accessed using the same name paths. The cluster architecture of the invention also enables a greater number of nodes to be supported by the cluster with significantly less overhead than otherwise would be required to support the heartbeats of large numbers of nodes as in a traditional cluster. The cluster provides (in the cluster database DDB) a set of APIs to configure and retrieve the cluster hierarchical membership information, such as, for example, which nodes belongs to which failover domains, the connected top-level and bottom-level failover domains of specific failover domains, etc. The cluster also maintains in the cluster DDB the hierarchical membership of the cluster, and the cluster master node N1 monitors the heartbeats between the failover domain master nodes of inter-connected failover domains. It is also responsible for determining failover paths and coordinating node merges across failover domains.

Figure 2:
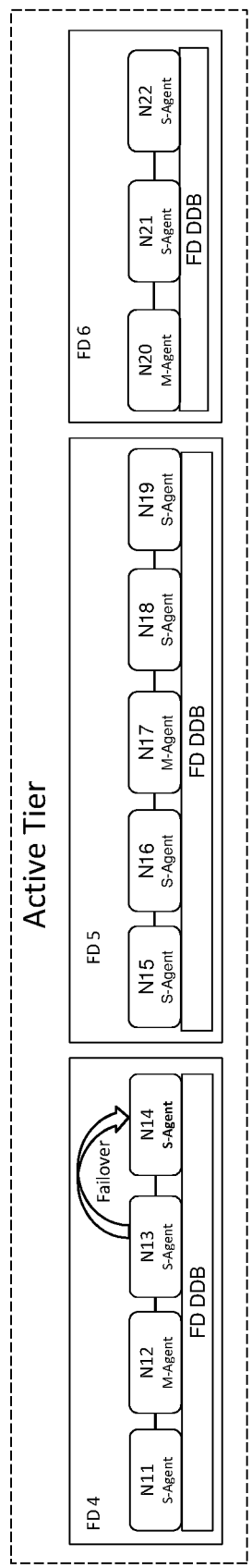
FIG. 2 is a diagrammatic view illustrating a failover from one node to another node within the same failover domain.

The cluster may have different failover policies to handle different failure scenarios. Each failover domain may configure its own HA (high availability) policy, which may optionally be one of Active-Active, N+1 Active-Standby, or N+M Active-Standby, as previously described. FIG. 2 illustrates an example of failover management for failure of one node in a failover domain, using as an example failure of node N13 in failover domain FD4. Upon failure of node N13, reconfiguration of FD4 is handled by master node N12. When a node failure occurs, its data service must be available by failover. Within a failover domain, a storage pool may be setup, as by using well known approaches. For performance efficiency, a storage pool will not be setup across multiple data tiers because of their different hardware and performance requirements. As shown in FIG. 2, the node N13 data and services may failover to node N14, for example, in the same FD4. In the event of multiple node failures within a failover domain, the invention may merge nodes across failover domains. For instance, in the event of a network partition, the invention affords failover across failover domains. A suitable failover domain having the capacity to handle the nodes in the failover domain experiencing the network partition may be determined by a search of the cluster database. Data replication may be used to move data between data tiers.

Referring to FIG. 3A, assuming that a network partition occurs within FD4, as indicated by the dotted line between nodes N12 and N13. In a traditional cluster, a partition without the majority of the nodes will be isolated, rendering its resources and services unavailable to the cluster. However, in the invention, because of the global namespace, the nodes N11-N14 of FD4 may be easily merged into another failover domain in the same data tier, such as FD5, as indicated, as long as the other failover domain has sufficient resources to handle the nodes of merged domain. After the merger, FIG. 3B shows the new configuration of FD 5 with the nodes of FD 4 merged into FD5. Before the failover merger, node N12 served as both HA master and namespace master for FD4. After the failover merger, N12 serves as only the namespace master for nodes N11-N14, while the previous master node N17 of FD5 serves as both HA master for the merged cluster as well as a namespace master.

If there is no suitable failover domain at the same data tier level as the failed domain with the network partition, the nodes in the failed domain may failover and be merged into the parent failover domain, e.g., FD1, in the case of FD4. As shown in FIG. 4A, upon a network partition occurring in FD4, and assuming that neither FD5 nor FD6 has sufficient resources to handle the nodes of FD4, the failover may be to parent domain FD1, as indicated in the figure, and the nodes of FD4 merged into FD1. After the merger, the resulting cluster configuration will be as shown in FIG. 4B. The domain FD4 is gone, and nodes N11-N14 are now merged into FD1.

Figure 6:
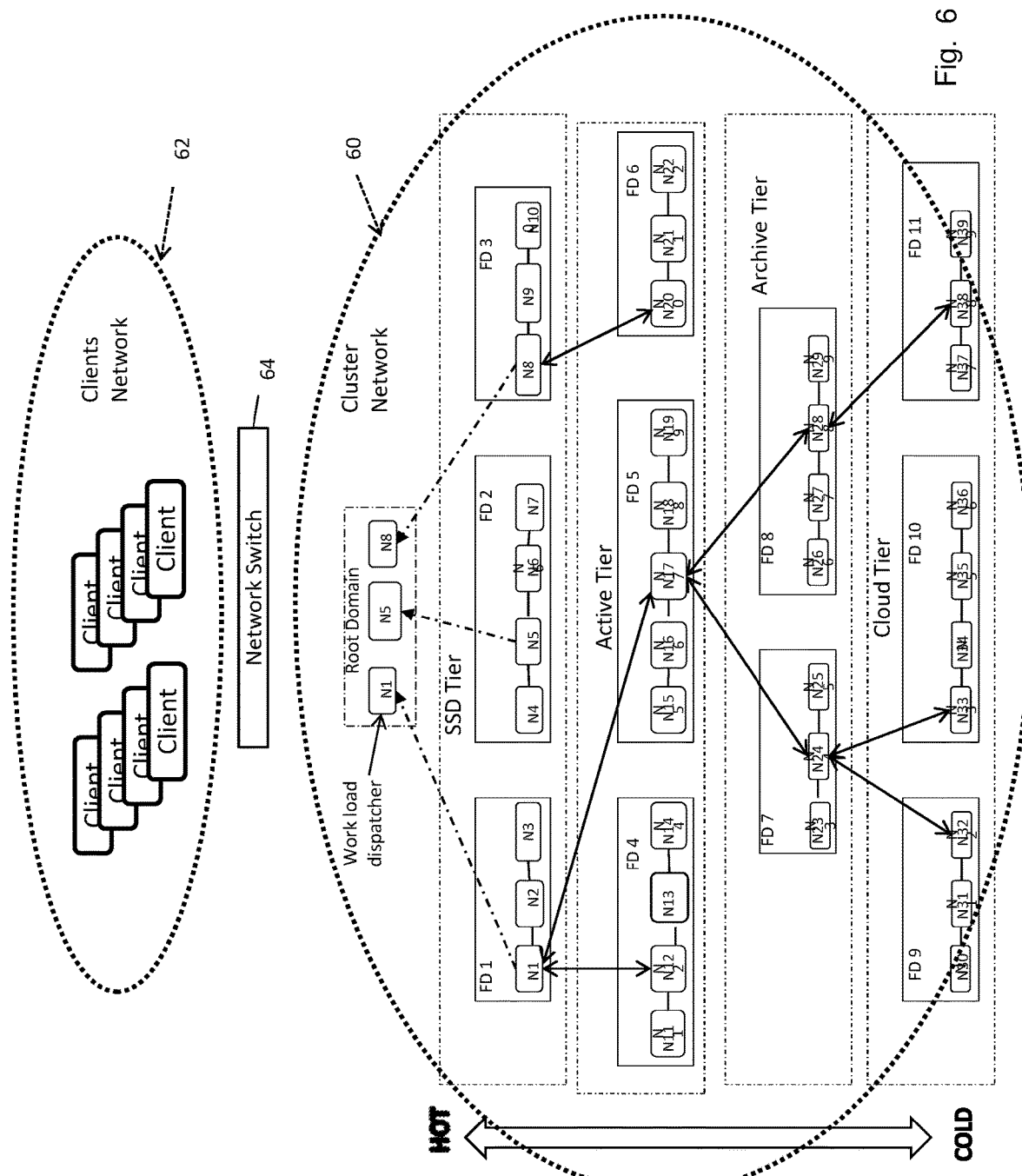
FIG. 6 is a diagrammatic view of an entire cluster showing the exchange of heartbeats between data tiers.

FIG. 6 illustrates a cluster 60 in accordance with the invention interfaced to a client network 62, comprising a plurality of clients, via a network switch 64. Clients access the cluster for data and services via the network switch. The master node N1 of the root domain performs the role of workload dispatcher. When a client requests a service, such as to write a file to the active tier for backup purposes, the request first arrives at the workload dispatcher node N1. The dispatcher node then selects an active tier node capable of servicing the request, and returns the address of the selected node to the client. The client connects to the indicated node using the address, and sends the file to be written to the node.

As may be appreciated from the foregoing, hierarchical membership cluster architecture in accordance with the invention has a number of advantages over traditional one-level flat cluster architectures. Because the invention affords a global namespace, different data tiers and different failover domains at each tier, it enables the nodes at each tier to be configured with different hardware and software selected to meet efficiently the different performance, availability, retention and protection requirements for different types of data, and to be easily reconfigured in the event of failures. The hierarchical architecture and multiple failover domains at each data tier substantially reduce the overhead associated with providing monitoring node availability to detect failures, and for providing different services and protection for data at a large number of nodes, and for facilitating reconfiguration of the cluster within and across data tiers to handle failures.

While the foregoing has been with reference to particular embodiments of the invention, it will be appreciated that changes to these embodiments may be made without departing from the principles and spirit of the invention, the scope of which is defined by the appended claims.

The invention claimed is:

1. A method of operating a hierarchical multiple level cluster data system for different tiers of data having different data availability, accessibility and protection requirements, comprising:

configuring pluralities of data processing nodes at each cluster level to have hardware resources selected to provide performances necessary to process data at a data tier corresponding to data stored at that cluster level;

organizing the pluralities of nodes at each said cluster level into a plurality of failover domains comprising groups of interconnected nodes, one node of each group being a master node and the remaining nodes of the group being slave nodes controlled by the master node, said one master node of each failover domain managing the nodes of the failover domain for the requirements of the tier of data of that failover domain, and one or more other nodes of the failover domain that are namespace master nodes managing a namespace of the nodes of said failover domain;

monitoring heartbeat signals exchanged between the pluralities of nodes to detect failures;

upon detecting a failure of one node in a failover domain, failing over the data services of the one failed node to another node in the same failover domain if said other node has sufficient resources to assume said data services, otherwise failing over said data services of the failed node to another node in the same tier as the failed node which has sufficient resources to assume said data services; and upon detecting an inability to communicate with multiple nodes in a failover domain, merging said multiple nodes into a different failover domain where there is no inability to communicate with said multiple nodes.

2. The method of claim 1, wherein said monitoring comprised monitoring by a master node of a failover domain heartbeat signals from master nodes at one or more lower cluster levels to reduce overall cluster overhead associated with monitoring heartbeat signals.

3. The method of claim 1, wherein said configuring comprises configuring the nodes at each cluster level into pools of active nodes and standby nodes for taking over data services for failed active nodes.

4. The method of claim 1, wherein said configuring comprises configuring nodes at said different cluster levels to be heterogeneous and configured for the performance and processing requirements of the tier of data at each said cluster level.

5. The method of claim 4, wherein said configuring comprises configuring nodes at an upper level of the cluster to have solid state storage for data that must be accessed substantially instantaneously and randomly.

6. The method of claim 4, wherein said configuring comprises configuring nodes at an intermediate cluster level with hardware selected for active data that are frequently restored or replicated and that have high sequential throughput and random access requirements.

7. The method of claim 4, wherein said configuring comprises configuring nodes at a low level of the cluster with hardware selected long term archive storage of infrequently accessed data.

8. The method of claim 1 further comprising configuring said cluster system to have a global namespace such that a file moved to a different cluster level is accessible using the same path name.

9. The method of claim 1, wherein said merging of multiple nodes into a different failover domain comprises merging said multiple nodes into a parent failover domain at a next higher cluster level of the system, and reorganizing said parent failover domain to handle nodes merged from the failed failover domain and nodes of the parent failover domain.

10. The method of claim 1 further comprising providing each failover domain with a distributed database which maintains a list of nodes of that failover domain and which is accessible by the nodes of that failover domain.

11. The method of claim 1, wherein a master node of a failover domain at a top level of the cluster is an overall cluster master node, and wherein said failover domain at said top level maintains a distributed database that stores the overall cluster node membership and configurations, and the method comprises replicating said distributed database to other failover domains at said top level of the cluster.

12. The method of claim 11, wherein said cluster master node serves as a work load dispatcher that receives requests from clients for cluster data services and assigns the requests to an active node in an appropriate data tier level.

13. A hierarchical multiple level cluster data system for different tiers of data having different data availability, accessibility and protection requirements, comprising:

a first cluster level at a top level of the hierarchical cluster configured for first tier data that requires substantially instantaneous access;

a second cluster level below the first cluster level configured for active data at a second tier that requires high sequential throughput and high random input;

one or more third cluster levels below the second cluster level configured for archive data that is to be archived for long periods of time;

a plurality of data processing nodes at each of said cluster levels, each node comprising hardware resources configured to provide performances to meet the data processing requirements for data at a data tier corresponding to said each cluster level;

a plurality of failover domains at each said cluster level, each failover domain comprising a subset of the plurality of nodes at each said cluster level, the nodes of each failover domain being interconnected for communications with the other nodes of said each failover domain, one of said nodes of each failover domain being a master node and the remaining nodes of the failover domain being slave nodes controlled by the master node, said one master node of each failover domain managing the nodes of the failover domain for the requirements of the tier of data of that failover domain, and one or more other nodes of the failover domain that are namespace master nodes managing a namespace of the nodes of said failover domain, the nodes of each failover domain being configured to exchange first heartbeat signals with other nodes of the failover domain, which first heartbeat signals indicate that said nodes of the failover domain are active and functioning, and the master node of each failover domain being configured to exchange second heartbeat signals with master nodes of failover domains at other cluster levels to detect failures, if any, of the nodes of failover domains at said other cluster levels;

a cluster master node comprising a master node of a failover domain of the first cluster level for controlling the master nodes of said failover domains; and a global namespace having a single naming level for all nodes in the cluster such that a node moved to any level of the cluster can be accessed using a same pathname.

14. The system of claim 13, wherein the nodes of each failover domain are organized into a pool of nodes comprising active nodes and standby nodes configured to take over data services from a failed active node.

15. The system of claim 13, wherein said top level of the hierarchical cluster comprises nodes having solid state memory, and said one or more third cluster levels comprises a cluster level storing data in a cloud.

\* \* \* \* \*